(12) United States Patent
Schmidt et al.

(10) Patent No.: US 9,365,664 B2
(45) Date of Patent: Jun. 14, 2016

(54) CATALYST ON SILICA CLAD ALUMINA SUPPORT

(71) Applicants: Stephen R. Schmidt, Silver Spring, MD (US); David M. Chapman, Ellicott City, MD (US); Manoj M. Koranne, Clarksville, MD (US); Michael D. Jensen, Laurel, MD (US)

(72) Inventors: Stephen R. Schmidt, Silver Spring, MD (US); David M. Chapman, Ellicott City, MD (US); Manoj M. Koranne, Clarksville, MD (US); Michael D. Jensen, Laurel, MD (US)

(73) Assignee: W. R. GRACE & CO. -CONN., Columbia, MD (US)

( * ) Notice: Subject to any disclaimer, the term of this patent is extended or adjusted under 35 U.S.C. 154(b) by 0 days.

(21) Appl. No.: 13/999,217

(22) Filed: Jan. 30, 2014

(65) Prior Publication Data
US 2015/0210784 A1 Jul. 30, 2015

Related U.S. Application Data

(62) Division of application No. 13/143,003, filed as application No. PCT/US2010/020374 on Jan. 7, 2010, now Pat. No. 8,673,806.

(60) Provisional application No. 61/206,290, filed on Jan. 29, 2009.

(51) Int. Cl.
C08F 110/02 (2006.01)

(52) U.S. Cl.
CPC .................. C08F 110/02 (2013.01)

(58) Field of Classification Search
CPC .......... B01J 21/12; B01J 21/063; B01J 23/26; B01J 23/44; B01J 23/6522; B01J 23/745; B01J 23/755; B01J 23/862; B01J 32/00; B01J 35/006; B01J 35/10; B01J 37/00
USPC .......................... 502/242, 256, 257, 259, 262
See application file for complete search history.

(56) References Cited

U.S. PATENT DOCUMENTS

| | | | |
|---|---|---|---|
| 2,563,650 A | 8/1951 | Heinemann | 252/455 |
| 2,742,437 A | 4/1956 | Hourdry | 502/262 |

(Continued)

FOREIGN PATENT DOCUMENTS

| | | |
|---|---|---|
| WO | 96/23010 | 8/1996 |
| WO | 98/27124 | 6/1998 |

(Continued)

OTHER PUBLICATIONS

L. C. Drake and H. L. Ritter, Ind. Eng. Chem. Anal. Ed., 17, 787 (1945).

(Continued)

*Primary Examiner* — Patricia L Hailey
(74) *Attorney, Agent, or Firm* — Charles A. Cross

(57) ABSTRACT

The invention concerns catalysts comprising (i) a clad catalyst support comprising (a) a core which comprises alumina particles and (b) about 1 to about 40 weight percent silica cladding, based on the weight of the clad catalyst support, on the surface of the core; the catalyst support having a BET surface area of greater than 20 $m^2/g$ and a porosity of at least about 0.2 cc/g; and (ii) 0.1 to 10 weight percent, based on the weight of the catalyst, of catalytically active transition metal on the surface of the clad catalyst support; wherein the catalyst support has a normalized sulfur uptake (NSU) of up to 25 $\mu g/m^2$. The invention also concerns the production and use of such catalyst.

15 Claims, 2 Drawing Sheets

(a) Uniformly Clad Porous Particle

(56) References Cited

U.S. PATENT DOCUMENTS

| | | | |
|---|---|---|---|
| 2,825,721 A | 3/1958 | Hogan et al. | 260/88.1 |
| 3,050,514 A | 8/1962 | Cawthon et al. | 526/105 |
| 3,145,196 A | 8/1964 | Engel | 260/94.9 |
| 3,624,063 A | 11/1971 | Witt | 260/93.7 |
| 3,976,632 A | 8/1976 | Delap | 526/113 |
| 4,154,812 A | 5/1979 | Sanchez et al. | 423/626 |
| 4,189,402 A | 2/1980 | Rekers et al. | 252/428 |
| 4,290,914 A | 9/1981 | Katzen et al. | 252/428 |
| 4,593,007 A | 6/1986 | Novinski | 501/105 |
| 4,607,019 A | 8/1986 | Best | 502/119 |
| 4,690,990 A | 9/1987 | McDaniel et al. | 526/138 |
| 4,721,696 A | 1/1988 | Kidd | |
| 4,803,253 A | 2/1989 | McDaniel et al. | 526/352.2 |
| 4,806,513 A | 2/1989 | McDaniel et al. | 502/107 |
| 4,806,813 A | 2/1989 | Sumi et al. | 310/254 |
| 4,837,193 A | 6/1989 | Akizaki et al. | 502/242 |
| 4,855,271 A | 8/1989 | McDaniel et al. | 502/107 |
| 5,179,178 A | 1/1993 | Stacy et al. | 526/64 |
| 5,200,379 A | 4/1993 | McDaniel et al. | 502/154 |
| 5,237,025 A | 8/1993 | Benham et al. | 526/114 |
| 5,244,990 A | 9/1993 | Mitchell | 526/125 |
| 5,275,992 A | 1/1994 | Mitchell et al. | 502/108 |
| 5,401,820 A | 3/1995 | McDaniel et al. | 526/348 |
| 5,461,126 A | 10/1995 | Knudsen et al. | 526/96 |
| 5,565,175 A | 10/1996 | Hottovy et al. | 422/132 |
| 5,591,417 A | 1/1997 | Buchanan et al. | 423/210 |
| 5,607,019 A | 3/1997 | Kent | 166/344 |
| 5,609,750 A | 3/1997 | Nat et al. | 208/122 |
| 5,624,877 A | 4/1997 | Bergmeister et al. | 502/120 |
| 5,866,663 A | 2/1999 | Brookhart et al. | 526/170 |
| 5,880,241 A | 3/1999 | Brookhart et al. | 526/348 |
| 5,880,323 A | 3/1999 | Brookhart, III et al. | 585/527 |
| 5,886,224 A | 3/1999 | Brookhart et al. | 564/272 |
| 5,891,963 A | 4/1999 | Brookhart et al. | 525/326.1 |
| 5,935,889 A | 8/1999 | Murrell et al. | 502/9 |
| 6,133,138 A | 10/2000 | Ishibashi | 438/623 |
| 6,174,976 B1 | 1/2001 | Killian et al. | 526/172 |
| 6,184,171 B1 | 2/2001 | Shih | 502/158 |
| 6,239,235 B1 | 5/2001 | Hottovy et al. | 526/64 |
| 6,288,007 B1 | 9/2001 | Lindblad et al. | 526/95 |
| 6,303,531 B1 | 10/2001 | Lussier et al. | 502/84 |
| 6,329,315 B1 | 12/2001 | Denton et al. | 502/232 |
| 6,399,535 B1 | 6/2002 | Shih et al. | 502/167 |
| 6,559,090 B1 | 5/2003 | Shih et al. | 502/152 |
| 6,875,722 B2 | 4/2005 | Wei et al. | 502/208 |
| 7,214,642 B2 | 5/2007 | McDaniel et al. | 502/217 |
| 7,253,135 B2 | 8/2007 | Wei et al. | 502/202 |
| 8,673,806 B2 | 3/2014 | Schmidt et al. | 502/256 |
| 2004/0029727 A1 | 2/2004 | Bodart et al. | 502/242 |
| 2005/0239977 A1 | 10/2005 | McDaniel et al. | 526/113 |
| 2007/0027276 A1 | 2/2007 | Cann et al. | 502/261 |
| 2007/0104623 A1 | 5/2007 | Dettling et al. | 422/177 |
| 2010/0120612 A1* | 5/2010 | Koranne et al. | 502/262 |
| 2010/0267552 A1* | 10/2010 | Koranne et al. | 502/243 |
| 2012/0190541 A1* | 7/2012 | Koranne et al. | 502/439 |

FOREIGN PATENT DOCUMENTS

| | | |
|---|---|---|
| WO | 98/30612 | 7/1998 |
| WO | 99/46302 | 9/1999 |
| WO | 99/46303 | 9/1999 |
| WO | 99/46304 | 9/1999 |
| WO | 2008/045175 | 4/2008 |
| WO | 2008042084 | 4/2008 |
| WO | WO 2010088013 A1 * | 8/2010 |

OTHER PUBLICATIONS

A. Clark et al. In Industrial Engineering Chemistry 48, 1152 (1956).

* cited by examiner (a) Uniformly Clad Porous Particle

1) Coating Defects
2) Bridging
3) Pore Diffusion Limitations
4) Homogeneous Nucleation

CATALYST ON SILICA CLAD ALUMINA SUPPORT

RELATED U.S. APPLICATIONS

This application is a Divisional Application of U.S. application having Ser. No. 13/143,003, filed on Jun. 30, 2011 and originally filed on Jan. 7, 2010 as PCT International Application Number PCT/US2010/020374, the disclosure of which is hereby incorporated herein by reference.

TECHNICAL FIELD

The present invention concerns catalysts having a transition metal on the surface of a silica clad alumina support.

BACKGROUND

Polyolefins are commonly prepared by reacting olefin monomers in the presence of catalysts composed of a support and catalytic metals deposited on the surfaces of the support. For olefin polymerization, transition metals, and especially chromium, are known choices for the metal. A number of supports for such catalysts are known in the art. The choice of support has a significant impact on the properties of the polymer that is formed. Silica supports have primarily been used because they form highly active polymerization catalysts. Silica supports, however, are not optimum because they tend to permit formation of long-chain branching ("LCB") in the polymers they produce.

Alumina supports are also known in the art for use in olefin polymerization, and are believed to reduce the amount of long-chain branching, but their activity is generally not as high as seen with silica supports with the same transition metals.

It is therefore desirable to have an olefin polymerization catalyst that is highly active and minimizes long chain branching. Despite the work that has been done in this area, there is a need for an olefin polymerization catalyst that minimizes long chain branching and produces high molecular weight polymers.

SUMMARY

There is provided a catalyst of transition metal, preferably including chromium, supported on a silica-clad, high surface area, alumina support. The supported catalyst exhibits enhanced activity, relative to unclad alumina supported catalyst, and minimizes long chain branching in the resultant polymer.

The invention generally includes catalysts comprising:

(a) a cladded catalyst support comprising (i) a core which comprises alumina particles and (ii) about 1 to about 40 weight percent silica cladding, based on the weight of the cladded catalyst support, on the surface of the core; the catalyst support having a BET surface area of greater than 20 m$^2$/g and a porosity of at least about 0.2 cc/g; and the catalyst support having a normalized sulfur uptake (NSU) of up to 25 µg/m$^2$; and (b) 0.1 to 10 weight percent, based on the weight of the catalyst, of catalytically active transition metal on the surface of the cladded catalyst support.

Typically, the core of the catalyst support of the present invention will comprise relatively large alumina core particles or agglomerations of a number of small core particles. When the core of the catalyst support is comprised of relatively large alumina particles, each of these large particles will be clad with silica as described herein. When the core of the catalyst support is comprised of agglomerations of smaller constituent particles, the cladding technique can be applied to each of the constituent particles, prior to agglomeration, to the agglomerated particles after agglomeration; or to both the constituent particles prior to agglomeration, and a second time to the agglomerate particles after agglomeration. Mixtures of two or more of the clad large core particles, clad agglomerated core particles, and/or small clad non-agglomerated particles, may also be employed in the catalyst support.

In some embodiments, the average diameter of primary particles to be agglomerated is 0.01 to 10 microns. In certain embodiments, the average diameter 0.05 to 5 or, in some preferred embodiments, 0.1 to 2 microns.

Agglomerated particles can have an average diameter of about 5-200, preferably 10-150, and most preferably 20-100 microns. These particles can be useful in, for example, a fluidized (stirred) reactor.

Certain particles of the invention can be cladded without agglomeration and used, for example in a stirred reactor. In some preferred embodiments, these particles are about 5-200, preferably 10-150, most preferably 20-100 microns.

Whether the particles are agglomerated or not, the catalyst support has a BET surface area of from 100 to 350 m$^2$/g. Certain of the alumina particles used in the invention have a nitrogen pore volume of from 0.2 to 2 cc/g.

In certain embodiments, the transition metal is Cr, Ti, Zr, Hf, Ni, Mg or mixtures of these. In other embodiments, the transition metal is Cr, Ti, or mixtures thereof. In yet other embodiments, the transition metal is Cr.

While any loading of transition metal on the catalyst that provides useful results is acceptable, generally, the transition metal is present in an amount of 0.1 to 3 weight percent, based on the weight of the catalyst. In some catalysts, the transition metal comprises 0.5-1.5 weight percent Cr and 1-3 weight percent Ti.

In one aspect, the present invention is also directed to a method of polymerizing olefins using the catalyst of the invention as described above. The catalyst is particularly effective in the polymerization of ethylene or copolymerization of ethylene with other olefins or ethyleneically-unsaturated monomers. In some embodiments, the active catalyst metal can be chromium alone, or may be chromium in combination with another metal, such as aluminum, boron, or mixtures of these. The molar ratio of aluminum to chromium is preferably 0.1-15; the molar ratio of boron to chromium is preferably about 1-6.

Yet another aspect of the invention concerns processes for making a catalyst of the kind described herein. One method comprises:

contacting (a) a catalyst support, which comprises a core of alumina particles and about 1 to about 40 weight percent silica cladding, based on the weight of the cladded catalyst support, on the surface of the core, the catalyst support having a surface area of greater than 20 m$^2$/g and a porosity of at least about 0.2 cc/g, with (b) a solution comprising a salt of at least one transition metal (salt) to produce an unactivated catalyst; and treating the unactivated catalyst with a heated gas to produce an activated catalyst. In some embodiments, heated air or heated CO can be used as the gas.

Suitable catalytically-active transition metals deposited on the support in this way include those described herein. In certain embodiments, the solution comprises the salt dissolved in water or alcohol. In some embodiments, the concentration of the salt in the solvent is 0.01 to 1 molar. Chromium is preferably introduced as an acetate or nitrate salt, and titanium is preferably introduced as a sulfate. The activation step preferably is contacting the unactivated catalyst with a gas, preferably an oxygen containing gas in some embodiments, heated to a temperature of 400 to 1000° C.

DETAILED DESCRIPTION OF ILLUSTRATIVE EMBODIMENTS

Figure 1A:
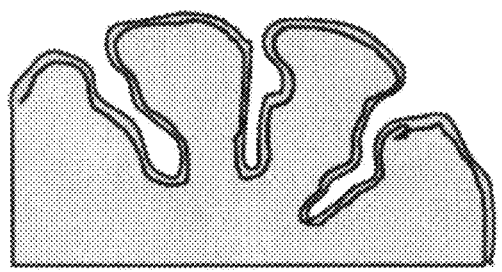
FIG. 1A pictorially represents a portion of a silica clad alumina particle.

The invention concerns catalysts comprising (i) a cladded catalyst support comprising (a) a core which comprises particulate alumina and (b) about 1 to about 40 weight percent silica cladding, based on the weight of the cladded catalyst support, on the surface of the core; the catalyst support having a BET surface area of greater than 20 $m^2/g$ and a porosity of at least about 0.2 cc/g; and (ii) 0.1 to 10 weight percent, based on the weight of the catalyst, of catalytically active transition metal on the surface of the cladded catalyst support; wherein the catalyst support has a normalized sulfur uptake (NSU) of up to 25 $\mu g/m^2$. Other aspects of the invention include the production and use of such catalysts. In embodiments in which the catalyst support particles are formed by the agglomeration of smaller particles, e.g. by spray-drying or by binding the smaller particles together in a slurry phase, the cladding may either be applied to the discrete primary particles prior to their being agglomerated, or applied subsequent to agglomeration, i.e. after combination of the smaller alumina particles into larger alumina particles.

The following terms, used in the present description and the appended claims, have the following definitions:

The term "support" refers to a material that carries an active catalytic material on its surface. In the present invention, the support comprises a high surface area alumina material having a cladding on the surface thereof, which cladding is capable of having a metal, such as a transition metal, immobilized on its surface in catalytic amounts.

The term "immobilized" as used herein and in the appended claims with reference to the incorporation of the catalytically active transition metal species, e.g., chromium, as part of the subject support refers to adsorption (adhesion to the surface of the support-agglomerate) and/or absorption (penetration into the inner structure of the support, preferably by chemisorption) of the catalyst species generated from the impregnation technique or directly applied to the support.

The term "particulate" refers to a variety of possible physical configurations in which the support material can be utilized including powders, beads, agglomerates, extrudates, and the like depending on the catalyst components they are intended to support and the polymerization conditions they are intended to operate under. The particles can be obtained by any means that provides material of suitable properties. For example, particles can be 'formed' by conventional spray drying, or obtained as discrete primary particles by precipitation and grinding techniques that are know to those skilled in the art. The alumina core particles may be clad as discrete primary particles (i.e. prior to forming into larger particles by e.g. spray drying) or as agglomerates of particles (after spray drying or other forming). The shape of the agglomerate may be determined by the end use needs of the process that utilizes the catalyst. In some embodiments, after forming the core, the alumina is agglomerated and clad with silica to form the catalyst support. In one embodiment, the alumina particles are formed by spray drying and clad with silica to form a catalyst support.

The term "alumina" refers to any of the forms of aluminum oxide alone or as mixtures with themselves and/or small amounts of other metals and/or metal oxides.

The term "cladding" refers to a thin (e.g. molecular thickness) covering on the surface of a substrate, such as alumina particulates. The covering may be substantially continuous. The cladding may be applied to discrete primary alumina particles or onto agglomerates of alumina particles.

The term "core" refers to alumina particulate prior to cladding according to the present invention. The core may further contain other metals, metal oxides and non-metal oxides and the like.

The term "agglomerate" [when used as a noun] refers to a product that combines particles which are held together by a variety of physical-chemical forces. More specifically, each agglomerate is composed of a plurality of contiguous, constituent primary particles, sized as described above, preferably joined and connected at their points of contact. Agglomeration may be carried out in accordance with the methods well known to the art, and, in particular, by such methods as spray drying, pelletizing, extrusion, shaping into beads in a rotating coating drum, and the like.

The term "pore volume" or "total pore volume" or "porosity" as used herein means the cumulative volume in cc/g of all pores discernable by either nitrogen desorption or mercury penetration methods. More specifically, for alumina particles which have not been agglomerated (e.g., by extrusion) the pore diameter distribution and pore volume is calculated with reference to the nitrogen desorption isotherm (assuming cylindrical pores) by the B.E.T. technique as described by S. Brunauer, P. Emmett, and E. Teller in the Journal of American Chemical Society, 60, pp 209-319 (1939).

In respect to alumina particles which have been agglomerated, e.g., formed into extrudates, the pore diameter distribution is calculated by means of the formula:

Pore diameter (Angstroms)=150/absolute mercury pressure in bar and in accordance with the mercury penetration method (as described by H. L. Ritter and L. C. Drake in Industrial and Engineering Chemistry, Analytical Edition 17, 787 (1945)), using mercury pressures of 1-2000 bar. Surface Area for composite particles as well as agglomerates is determined however by the nitrogen desorption method.

The total $N_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using a contact angle of 130°, a surface tension of 485 dynes/cm and a Hg density of 13.5335 gm/cc.

All morphological properties involving weight, such as pore volume (cc/g) or surface area ($m^2/g$) are to be normalized to a Metals Free Basis as defined in accordance with Equation 4 described in Example 20 of U.S. Pat. No. 6,303,531.

All fresh surface areas are determined on samples which have been outgassed under vacuum at 350 deg C. (662 F) for 2 hours.

All particle size and particle size distribution measurements described herein are determined by a Mastersizer unit from Malvern, which operates on the principle of laser light diffraction and is known to all familiar in the art of small particle analysis.

As is known to those skilled in the art, the agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia and silica-boria. Conventional pore-forming agents which can be used in particular, include wood flour, wood charcoal, cellulose, starches, naphthalene and, in general, all organic compounds capable of being removed by calcination.

The term "adsorbed" or "adsorption" refers to the phenomena of adsorption (the ability to hold or concentrate gases, liquid or dissolved substances on the surface of the adsorbent [e.g. alumina]), or absorption (the ability to hold or concentrate gases, liquids or dissolved substances throughout the body of the absorbent [e.g. alumina]); either by physical forces or chemical reaction which may be ionic, covalent or of mixed nature.

The term "sulfurous material" refers to sulfur, sulfur oxides and other compounds containing sulfur atoms.

The term "oxidizing gas" refers to an oxygen-containing gas such as air.

The term "transition metal" as used herein generally refers to Groups IIIA through VIII of the periodic table (IUPAC). Suitable transition metals include Ni, Fe, Ti, Mg, Zr, Cr, Hf and Pd. In certain embodiments, the transition metal comprises Cr, Ti, or mixtures thereof. In yet other embodiments, the transition metal is Cr. Transition metals can be in various oxidation states.

In some embodiments, a variety of organometallic complexes or coordination compounds may be used; such as chromocene or bis(triphenylsilyl)chromate. For example, the transition metal, in the form of an organochromium compound can be deposited on the surface of the unactivated catalyst. In certain embodiments, the final activated catalyst can be prepared by heat treatment of the catalyst as described herein. These compounds include zero valent compounds such as pi bonded chromium complexes, such as dicumene chromium and dibenzene chromium. Pi bonded chromium complexes are described in U.S. Pat. No. 3,976,632, the disclosure of which is incorporated by reference herein in its entirety. Other compounds include divalent and trivalent organochromium compounds such as chromocene (bis(cyclopentadienyl) chromium (II)), and substituted derivatives thereof. Other examples of organochromium compounds can be found in U.S. Pat. Nos. 4,806,513, 4,690,990, 4,803,253, and 5,200,379, the disclosures of which are incorporated by reference herein in their entirety The supports used in the invention are composed of high surface area alumina particulate having a silica cladding thereon, as fully described herein. Such supports include those described in PCT Patent Application No. 2008/045175, the disclosure of which is incorporated by reference herein in its entirety.

The alumina may be selected from any aluminum oxide form desired for the particular application contemplated. It is well known that alumina or aluminum oxide occurs in various forms with the more common ones being:

gamma-alumina, a form stable up to about 900° C. at which temperature it converts to delta-alumina;
delta alumina, a form stable up to about 1000° C. at which temperature it converts to theta-alumina;
theta-alumina, a form stable up to about 1000° C. at which temperature it converts to alpha-alumina;
aluminum monohydrate or Bohmite, which is prepared by a variety of routes such as the addition of ammonium hydroxide to an aqueous solution of aluminum chloride (The material initially precipitates as an amorphous floc, which rapidly converts to crystalline Bohmite. Alternately, it is prepared by reaction of aluminum sulfate with sodium aluminate);
aluminum trihydate or Gibbsite, formed by aging Bohmite in basic solution;
alpha-alumina trihydrate or Bayerite, is the intermediate form when going from Bohmite to Gibbsite;
other forms of hydrated aluminum oxide such as bayerite and the like; and
other forms of alumina, such as eta-alumina and the like.

In some embodiments, the alumina used in forming the catalyst core can have a substantially amorphous structure. The amorphous nature is believed to be due to the heat profile that can be used in treating aluminum hydroxides such as a rapid dehydration of aluminum hydroxide (i.e., short exposure to high temperature). Such alumina is sometimes referred to as active alumina and is generally described in U.S. Pat. No. 6,303,531, the disclosure of which is incorporated herein by reference.

Some preferred catalysts, unlike catalysts disclosed elsewhere in the art, are not based on sulfated aluminas and are not based on alumina derived from fluoriding the alumina.

The alumina can be doped with conventional dopants, such as transition metals and metal oxides, alkaline earth metal oxides (such as, Mg and Ca), rare earth oxides, silica and the like and mixtures thereof. Examples of such dopants include rare earth metals and their oxides (such as lanthana), magnesia, calcia, and the like. A dopant, when used, is normally present in small amounts, such as from 0.1 to 10, preferably from 1 to 5, weight percent of the high surface area alumina particulate core material. The dopants can be added prior to cladding according to the present invention. The dopants are normally present in the alumina particulate (co-precipitated from solution, for example) to impart particular properties, such as hydrothermal stability, attrition strength, catalytic activity promotion and the like, as is well known to the artisan.

The high surface area alumina particulate may be in the form of powder (preferred in some embodiments) having an average particle size of from about 1 to 200 μm, preferably from 10 to 100 μm; or beads having an average particle size of from 1 mm to 10 mm. Alternately, the alumina particulate can be in the form of pellets or extrudate (e.g. cylindrical shape). The size and particular shape are determined by the particular application contemplated.

The base (core) of the support composed of alumina particulate should have a high (BET) surface area of at least about 20 m$^2$/g, such as from about 20 to about 400 m$^2$/g, preferably from about 75 to 350 m$^2$/g and more preferably from 100 to 300 m$^2$/g. The core alumina particulate of the support has a pore volume of at least about 0.2 cc/g, such as from 0.2 to 2 cc/g and preferably from 0.5 to 1.2 cc/g and an average pore diameter within the range of 50 to 1000 Angstroms, preferably from 100 to 300 Angstroms. Such high surface area particulate provides ample surface area for deposition of a transition metal catalyst and for having it then available for contact with reactants in the polymerization process.

The particulate aluminum hydrates may be calcined before cladding. In some embodiments, however, calcination is only done after cladding and drying. Alternatively, calcination may be done before and after cladding. A calcining process can remove residual water and convert aluminum hydroxyl groups to their oxide counterpart (although residual hydroxyl groups remain as part of the alumina structure, especially on the surface of the particles).

Alumina particulates suitable as a core for the cladded support of this invention are commercially available. However, particular design criteria (such as use of particular dopant, particulate pore volume, and the like) for a particular application may require fabrication of the alumina particulate by known methods.

Alumina particulate material clad with silica provides a support for metal catalysts, which exhibit unexpected high sulfur tolerance (lack of adsorption). It has been previously suggested in the art to combine alumina with silica either by coprecipitation or impregnation techniques to achieve a support product. In addition to any other advantage, low sulfur uptake can serve as a diagnostic analytical indicator of cladded material to distinguish it from aluminas combined with silicas in the previous ways.

In one example of cladding technique, the alumina particulate is first formed into aqueous slurry in which the solid concentration is within the range from 5 to 50 weight percent. The slurry should be sufficiently fluid to readily allow mixing of the slurry with the solution described below. The specific concentration used within this range will depend on the physical properties (e.g. surface area, void volume, etc. as well as particle size and shape) of the alumina forming the slurry. The concentration of alumina solids should be such that mixing of the slurry can be readily accomplished. Whether cladding agglomerates of alumina particles or individual particles, the solutions, temperatures and other conditions described herein may be utilized.

The slurry is heated to a temperature ranging from 50° to 100° C., preferably from 80° to 100° C. and most preferably from 90° to 95° C. Higher temperatures may be used but require the use of pressurized vessels. The increased equipment and handling costs to provided elevated temperatures above that indicated above are not necessary.

An aqueous solution of a water-soluble silica precursor compound is used. The silica precursor compound is preferably selected from an alkali metal silicate, such as, sodium silicate, potassium silicate and the like and mixtures thereof, with sodium silicate being preferred. The concentration of the silica precursor compound should be from 5 to 30, preferably 10 to 25 weight percent $SiO_2$ in the precursor solution. Although it is preferred to heat the solution to a temperature substantially the same as that of the alumina slurry prior to introduction into the heated alumina slurry, this preheating is not required.

The amount of aqueous solution of water soluble silica precursor compound relative to the amount of the alumina slurry will depend on the concentration of precursor in the solution and the desired weight percent of silica cladding to be part of the resultant clad alumina product. This amount can be readily calculated by the artisan.

The aqueous solution of silica precursor compound is mixed with the alumina slurry to form a uniform mixture of the materials. The temperature should be sufficient to maintain the silica precursor compound in solution. Such temperature is normally in the range of from 50° to 100° C., preferably from 80° to 100° C. and most preferably from 90° to 95° C. The mixture is maintained at this elevated temperature for a period of time of from about 1 to 120 minutes, preferably from about 30 to 60 minutes and most preferably from about 45 to 60 minutes while maintaining sufficient agitation to maintain a uniform mixture.

The mixture is then treated with a water soluble acid, as necessary, to obtain a pH within the range of from 5 to 8, preferably 7 to 8. The acid may be selected from any inorganic mineral acid such as nitric, sulfuric or hydrochloric acid or mixtures thereof. Alternately, one can use a water soluble $C_2$-$C_5$ (preferably $C_2$-$C_3$) organic acid as, for example, acetic, propionic, butanoic, pentanoic acid and the like and mixtures thereof with acetic acid being preferred. Preferred are the inorganic acids, with hydrochloric acid and nitric acid being most preferred.

The aqueous solution of acid should be introduced into the prior formed mixture of silica precursor compound and alumina at a substantially uniform rate to cause the pH of the mixture to be uniformly lowered to an initial pH within the range of from 7 to 8 (preferably a pH of 7.5 in some embodiments) over an addition period of from 5 to 240 minutes, preferably from 15 to 60 minutes and more preferably from 30 to 60 minutes. The acid addition should be conducted at a uniform, slow rate with continuous mixing to cause uniform distribution of the acid throughout the mixture. High rates of addition should be avoided. This slow, uniform addition with mixing should be conducted at least until the mixture attains the pH value of 8. Further addition of acid may be accomplished to provide for the desired end point pH (stated herein above) of the mixture. Still further, the acid in the addition solution can be of any concentration of acid (preferably from 0.5 to 3 molar) to permit the addition to be performed in a slow, uniform manner over the time period expressed above. The pH adjustment of the mixture can be performed at any temperature, such as from ambient to 100° C., with 90 to 95° C. being preferred.

The resultant aqueous suspension of the treated alumina particulates is then washed to remove the alkali metal material from the treatment suspension. The washing may be conducted using hot water or an aqueous solution of a water-soluble ammonium salt such as, for example, ammonium nitrate, ammonium sulfate, ammonium hydroxide, ammonium carbonate and the like or mixtures thereof. Ammonium nitrate, ammonium hydroxide and ammonium carbonate are preferred agents.

When the wash water is determined to be free of alkali metal, the aqueous suspension is filtered and the resultant solid is either spray-dried, dried in a static bed, or flash-dried to provide a powder product. This product is then calcined at elevated temperatures of from 400° to 1000° C. with from 600° to 800° C. being preferred.

The resultant product is a high surface area alumina particulate having silica cladding on substantially the entire surface area. Unlike prior silica treated alumina products produced by conventional impregnation techniques, the present resultant product retains its high surface area and pore volume properties (thus, showing that the present clad product does not result in deposition which causes bridging of the pores to result in pore blockages. Further, infra-red spectrum analysis of the silica clad alumina particulate shows attenuation of adsorption peak associate with the Al—OH bond relative to the untreated alumina particulate and, at about 5 weight percent, the Al—OH adsorption peak is no longer present. At the same time, silanol groups (Si—OH) appear. This is indicative that, above some minimum silica level, the silica fully clads the surface of the alumina particulate material.

The aqueous silicate solution used to contact the alumina particulate should have sufficient concentration of silicate to cause the resultant silica clad alumina product to have from 1 to 40 weight percent silica ($SiO_2$), preferably from 5 to 30 weight percent silica based on the total weight of the resultant product. Low amounts of silica, such as from 8 to 20 weight percent and even from 8 to 15 weight percent, can be readily used to provide a support material having very low amount of sulfur adsorption. The silica clad alumina of the present invention is a product having a low normalized sulfur uptake (NSU), as described herein below, of up to about 25 µg/m² of support material. It is preferable to have the silica clad alumina have a NSU of up to about 10 or 15 µg/m² of surface area of support material. The $SO_2$ uptake test results can be used as a probe for determining the presence of the silica cladding.

The portion of a resultant silica clad alumina particle is pictorially shown in FIG. 1A. The silica forms a substantially uniform, very thin covering on substantially the entire surface of the alumina including the pore surfaces without bridging to block off the pores.

The resultant product formed according to the present invention has been found to have a high degree of tolerance to sulfur and sulfurous compounds (e.g. $SO_2$), which may be liberated during the activation process by a sulfate salt, as used as the vehicle for deposition of the catalytic metal. The sulfur uptake may be used as an indication of the continuity of silica cladding effected on the alumina core. In short, the lower the degree of sulfur uptake, the more continuous the coating of the silica is expected to be, because the sulfur only reacts with the alumina and not the silica.

Figure 1B:
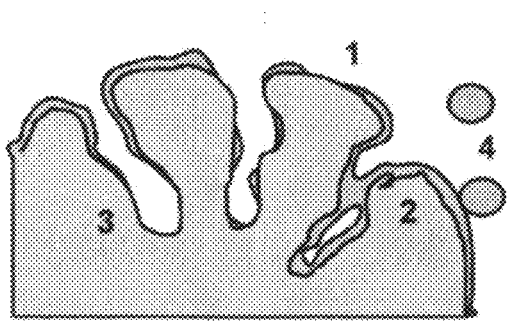
FIG. 1B pictorially represents discontinuous forms of coating of a porous portion of an alumina particulate

The discontinuous forms of coating of a porous substrate are shown by pictorial representation of a portion of an alumina particulate in FIG. 1B. These include: 1) general coating defects (which permit sulfur poisoning), 2) bridging of the coated material to block off pores (which reduces the surface area and limits the ultimate activity of the catalyst), 3) pore diffusion limitations (which results in poor coating at the interior of porous particles), and 4) homogeneous nucleation of the coating material (which contaminates the product with small particles of the coating material).

The method described above has been found to achieve a support product having resistance to sulfur adsorption while retaining thermal and/or hydrothermal stability. It is believed that the present silica clad alumina support, as depicted in FIG. 1A has silica cladding substantially over the entire alumina particle surface without the defects of a discontinuous coating, as described above.

Alumina particulate, having the presently required substantially uniform silica cladding, has superior resistance to sulfur uptake. The uniformity and breadth of the cladding can be tested by the resistance of the alumina to sulfur uptake. Sulfur uptake (SU) of a sample can be measured by the following "Sulfation Test". This test is performed by loading 50 mg of sample into a thermo gravimetric analyzer (TGA). The sample is first treated with 107.5 cc/min of He gas for 1 hour at 300° C. After this treatment, still maintaining 300° C. for the sample cell, the flow of $SO_2$ in He (1.14% $SO_2$) is introduced at 5 cc/min and simultaneously $O_2$ is introduced at 12.5 cc/min. The total flow rate is 125 cc/min and the $SO_2$ concentration is 456 ppm. The sulfur uptake is measured as a function of time. In about 120 minutes, the sulfur uptake is equilibrated, at which point, no more uptake is possible. The Sulfur Uptake (SU) is defined as percentage of weight gained after 120 minutes of time-on-stream. The normalized sulfur uptake (NSU) is calculated by the following formula:

$$NSU = \frac{SU(\text{wt \%})}{100 \times SA}$$

where SU is the sulfur uptake in weight percent measured after 120 minutes of time-on-stream, and SA is the BET surface area of the sample.

A direct comparison of the silica clad products of the present invention to that of an unclad alumina products or a silica-alumina product having the same weight percent silica formed by conventional impregnation or co-precipitation techniques shows that the present silica clad alumina particulate is superior in sulfur tolerance to that formed by these conventional techniques. See PCT Patent Application No. WO 2008/045175.

The transition metal(s) can be applied to the support of this invention in manners well known to those skilled in this art using a suitable conventional transition metal precursor (acidic, basic, or neutral), or by dipping in a suitable transition metal precursor solution (either acidic, basic, or neutral).

In some embodiments, the process for making a catalyst comprises (i) contacting (a) a catalyst support, which comprises a core of alumina particles and about 1 to about 40 weight percent, based on the weight of the cladded catalyst support, of silica cladding on the surface of the core, the catalyst support having a surface area of greater than 20 m²/g and a porosity of at least about 0.2 cc/g, with (b) a solution comprising a salt of at least one transition metal, to produce an unactivated catalyst; and (ii) treating the unactivated catalyst with a heated gas to produce an activated catalyst. In preferred embodiments, the solution is salt dissolved in a water or alcohol solvent, the concentration of the salt in the solvent being 0.01 to 1 molar. In further preferred embodiments, the transition metal is chromium, either alone or in combination with titanium, where the chromium is introduced as an acetate or nitrate, and the titanium is introduced as a sulfate. For some processes, the activation/treating step is performed using gas heated to a temperature of about 400 to about 1000° C.

In some embodiments, the present catalysts can be used for polymerizing at least one monomer in the presence of a catalyst described herein. In certain embodiments, unlike the typical alumina-supported polymerization catalysts of the prior art, the present catalysts do not need to be sulfate treated to achieve high activity. See, U.S. Patent Application No. 20050239977. Examples of suitable polymerization monomers include mono-olefins containing 2 to 8 carbon atoms per molecule such as ethylene, propylene, 1-butene, 1-pentene, 1-hexene, and 1-octene. A chromium-based catalyst is particularly suitable for producing polyethylene homopolymers and copolymers of ethylene and mono-olefins containing 3 to 8 carbon atoms per molecules.

The catalysts described herein can be employed as a variety of catalyst system components, including Ziegler-Natta, metallocene, Cr, Ni or Pd based complexes, catalysts, co-catalysts, and activator components.

"Ziegler-Natta" ("ZN") catalysts are conventionally understood to comprise a transition metal (Group IIIB through VIIIB) halide, alkyl, aryl, or alkoxy compounds and mixtures thereof in combination with Group I through III elements of the Periodic Table. A typical example is $TiCl_4$ and $AlEt_3$. Preferred Zeigler-Natta systems are those employing a complex of magnesium chloride/titanium halide or alkoxy compound and an aluminum alkyl deposited on the novel supports of this invention. Methods of producing catalysts are known in the art. Electron donors may also be used in Zeigler-Natta catalyst systems of the present invention and include, esters, ethers, amines, silanes and alcohols, and mixtures thereof.

"Metallocene" catalysts are commonly understood to mean organometallic compounds having a transition metal, including rare earth metals, in coordination with members of at least one five-member carbon ring, hetero-substituted five-member carbon ring, or a bridged (ansa) ligand defined as two cyclic moieties capable of coordinating to the transition or rare earth metals wherein the ansa bridge B can be carbon, silicon, phosphorus, sulfur, oxygen, nitrogen, germanium, species such as $CH_2CH_2$ (ethylene), $Me_2Si$ (dimethylsilyl), $Ph_2Si$(diphenylsilyl), $Me_2C$ (isopropylidene), $Ph_2P$ (diphenylphosphoryl), $Me_2SiSiMe_2$, (tetramethyldisilane) and the like. In particular, preferred metallocenes are derivatives of a cyclopentadiene (Cp), including cyclopentadienyl, substituted cyclopentadienyls, indenyl, fluorenyl, tetrahydroindenyl, phosphocyclopentadienes, metallocyclopenta-2,4-dienes, bis(indenyl)ethane, and mixtures thereof. Metallocene catalyst is typically activated by combining the active metal species with boranes, borates, or aluminoxane compounds well known in the art.

The transition metal component of the metallocene is selected from Groups IIIB through Group VIII of the Periodic Table and mixtures thereof, preferably Group IIIB, IVB, VB, VIB, and rare earth (i.e., lanthanides and actinides) metals, and most preferably titanium, zirconium, hafnium, chromium, vanadium, samarium, and neodymium. Of these, Ti, Zr, and Hf are most preferable.

It is also believed that the alumina cladded support compositions and methods described herein are suitable for supporting with the bidentate and tridentate catalyst systems that are palladium and nickel-based complexes (e.g., Ni, Pd, coordinated to diimine (non-cyclopenta-dienyl, nitrogen-containing) ligands) as described in U. S. Pat. No. 5,880,241 and its divisional counterparts, U.S. Pat. Nos. 5,880,323; 5,866,663; 5,886,224; 5,891,963; 6,184,171; 6,174,976; 6,133,138; and PCT International Application Nos. PCT/US98/00316; PCT/US97/23556; PCT/GB99/00714; PCT/GB99/00715; and PCT/GB99/00716. Typical versions of these catalysts are cationic and can be activated in ways similar to metallocenes using aluminoxane or borate co-catalysts.

Ziegler-Natta, metallocene, and Ni, Pd based complex catalysts, co-catalyst, and activator components can be impregnated in and on the supports of the present invention using any number of known techniques. Thus, the catalyst components sought to be impregnated into the supports of the present invention are typically dissolved or suspended in an organic solvent, the support is added and slurried, and optionally solvent evaporated. Evaporation desirably takes place in a conical dryer which avoids applying high stress to the core material. Many variations on this theme are possible and the particular impregnation technique will depend on the particular catalyst system to be employed, as is well known in the art.

Suitable hydrocarbon media which can be employed for impregnation and which can serve as diluent or solvent for catalyst components employed include, aliphatic hydrocarbons, aromatic hydrocarbons, naphthenic hydrocarbons, and combinations thereof. Particularly, suitable hydrocarbons include, for example, pentane, isopentane, hexane, heptane, octane, isooctane, nonane, isononane, decane, cyclohexane, methylcyclohexane, toluene, and combinations of two or more of such diluents. Ethers such as diethylether and tetrahydrofuran can also be used.

The temperature employed for impregnation is generally from $-20°$ C. to $120°$ C., preferably from $0°$ C. to $100°$ C., and most preferably from $20°$ C. to $70°$ C.

For oxygen or moisture sensitive catalyst components, the above described process steps should be conducted under an inert atmosphere to exclude air (oxygen) and moisture as much as possible. Suitable inert gases include nitrogen, argon, helium, and the like.

The alumina cladded support described above is most advantageously used to prepare a chrome catalyst, more particularly a chrome catalyst in the category of catalysts commonly referred to as a "Phillips" catalysts which is employed in a process commonly referred to as a "Phillips Process". The Phillips Process for ethylene polymerization developed around the Phillips catalyst that is composed of chromium oxide on silica as the support. This catalyst was developed by Hogan and Banks and described in U.S. Pat. No. 2,825,721, as well as A. Clark et al. in Ind. Eng. Chem. 48, 1152 (1956). Commercialization of this process provided the first linear polyalkenes and accounts for a large amount of the high-density polyethylene (HDPE) produced today.

More specifically, a chrome catalyst can be prepared by contacting the cladded alumina support with a chromium compound, such as a salt, that is at least partially soluble in water or an organic liquid media. The chromium salt may be contacted with the cladded alumina support either during or after application of the cladding, or upon mixing of the cladded support particles prior to agglomeration, such as by spray drying or after agglomeration has been completed. It is preferred that an aqueous solution or suspension of the chromium salt be contacted with an aqueous slurry of the cladded support if in unagglomerated form, or subsequent to agglomeration if the support is in the agglomerated form.

The chromium compound suitable for use in forming the subject catalyst composition can be selected from any chromium salt of an inorganic or organic acid that has some degree of solubility with respect to the media used to mix the salt with the cladded alumina, as applicable. The preferred medium is water. For example, suitable inorganic salts are chromium halides, such as chromium dichloride, chromium chloride hexahydrate, chromium dibromide, chromium bromide hexahydrate, chromium tribromide chromium difluoride; as well as chromium nitrate; chromic anhydride, chromium phosphate; chromium$^{(II)}$ sulfate; chromium sulfate pentadecahydrate and octadecahydrate; chromium orthophosphate; and the like and mixtures thereof.

Organic chromium compounds suitable as a chromium atom source for forming the present catalyst include salts of organic acids, such as chromium acetate, chromium acetate hydrate, chromium acetylacetonate, chromium proprionate, chromium oxalate hydrate, chromium oxalate hexahydrate; amine complexes such as hexamine chromium III chloride; chloropentamine chromium chloride; hexaurea chromium III fluorosilicate; chromocene and the like and mixtures thereof.

Certain chromium compounds found useful herein have greater solubility in organic solvents. These compounds include, for example, chromocene, bis-(triphenylsilyl)chromate and the like. In such instances, the salt may be contacted with the support using an organic liquid solution followed by vacuum evaporation of the organic solvent at temperatures of from ambient to about $40°$ C., such as would occur during spray drying.

The preferred chromium precursors include chromium sulfate, chromium nitrate, chromium acetate and chromium acetylacetonate. The most preferred precursor chromium salts are the acetate and nitrate salts of chromium.

The chromium precursor may be immobilized on the support described above by:

1) contacting an aqueous solution or suspension of the chromium precursor with the support in its large particle unagglomerated embodiment;

2) contacting an aqueous solution of a mixture of the support with the chromium precursor prior to agglomerating the mixture, such as by spray drying; or 3) contacting previously formed support agglomerate with a solution of the chromium precursor salt.

In each instance, the chromium precursor is introduced, as an aqueous or organic solution (preferred), or slurry (that is formed from a salt having partial solubility in the mixing media). The materials may be contacted for a period of time of from about 15 to about 150 minutes, with from about 15 to 100 minutes being preferred. In certain instances, the materials are mixed for between 15 and 60 minutes and then allowed to remain in the mixer without agitation for a period of up to about 180 minutes. The materials are normally mixed at a temperature of from ambient to about 40° C.

The resulting supported chromium catalyst is then dried. Product separation from the drying air follows completion of the spray drying stage when the dried product remains suspended in the air. Any convenient collection method can be employed, such as removal from the base of the spray dryer by the use of separation equipment.

The product of the support that has been treated with chromium precursor is subjected to oxidation to oxidize the chromium atom to a chromium (VI) oxide. The oxidation will typically be conducted at sufficient temperature and time to reduce the total volatiles to between about 0.1 and 8 wt. % where the total volatiles are determined by measuring the weight loss upon destructive calcination of the sample at 1000° C. However, oxidation will typically be conducted by heating the chromium precursor treated support to temperatures of typically from about 600 to about 1800° F. (157 to 815° C.), preferably from about 800 to about 1500° F. (220-435° C.), and most preferably from about 800 to about 1100° F. (220-312° C.) for periods of typically from about 1 to about 600 (e.g., 50 to 600), and preferably from about 50 to about 300 minutes. The atmosphere of oxidation should be air or other oxygen-laden gas. Oxidation should be conducted in manners that will avoid sintering.

After formation, the supported chromium catalyst is preferably sized prior to oxidation. This can be conveniently accomplished by screening or air classifying as is well known in the art. The particle size and particle size distribution selected will depend on the catalyst type and polymerization process to be applied, as would be well known in the art.

The subject supported chromium catalyst of the present has been found useful as the sole catalyst for the polymerization of olefinic monomers. Alternately, the chromium material formed according to the present invention may be used in combination with a metallocene or bi- or tridentate complex containing catalyst, such as those described in U.S. Pat. No. 6,559,090, and U.S. Pat. No. 6,399,535, the teachings of which related to the afore described catalyst, their use, and preparation are incorporated herein by reference in their entirety. The subject supported chromium catalyst, described herein above, may be further used as the support for a metallocene catalyst or a metallocene pre-catalyst compound. When a metallocene utilizes the support of the present invention as its support in combination and on the same particle with the chromium catalyst, the chromium supported catalyst should be first formed followed by contacting this product with a metallocene compound. Alternately, the supported chromium catalyst may be used in combination with an independently formed supported metallocene catalysts on separate particles.

The supported catalyst thus prepared can be employed, without separation or purification, in the polymerization of olefins as described hereinafter. Alternatively, the supported catalyst can be stored in the hydrocarbon medium, or isolated from the hydrocarbon medium and dried and stored under inert conditions for an extended period of time, for example, for one to several months.

Catalyst system components supported on the core described herein are useful to produce polymers using solution polymerization, slurry polymerization, or gas phase polymerization techniques. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

Methods and apparatus for effecting such polymerization reactions are well known. The supported catalyst according to the present invention can be used in similar amounts and under similar conditions known to olefin polymerization catalysts. Typically for the slurry process, the temperature is from approximately 0° C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium, up to approximately 275° C.

The pressure used can be selected from a relatively wide range of suitable pressures, e.g., from subatmospheric to about 20,000 psi. Suitable pressure is from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_4$ to $C_{10}$ hydrocarbon, e.g., isobutane or an aromatic hydrocarbon liquid such as benzene, toluene or xylene. The polymer is recovered directly from the gas phase process or by filtration or evaporation from the slurry process, or evaporation of solvent from the solution process.

Suitable reactors include slurry reactors, gas-phase reactors, solution reactors or combinations thereof. Slurry reactors can comprise vertical loops or horizontal loops. Gas-phase reactors can comprise fluidized bed reactors or tubular reactors. Solution reactors can comprise stirred tank or autoclave reactors. In some embodiments, such reactors can be combined into multiple reactor systems operated in parallel or in series. The catalyst also may be used to produce ethylene polymers in a particle form process as disclosed in U.S. Pat. Nos. 3,624,063, 5,565,175, and 6,239,235, which are incorporated by reference herein in their entirety. The amount of catalyst present in the reaction zone may, range from about 0.001% to about 1% by weight of all materials in the reaction zone.

In one embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged. In all of the above examples, hydrogen gas can be introduced into the reaction zone where desired to reduce the molecular weight of the polymers formed.

In some embodiments of the reaction, a co-catalyst may be used in conjunction with the catalyst of the present invention. The co-catalyst may be contacted or mixed with the present catalyst either before or after entry into the reaction zone. For example, the catalyst and co-catalyst may each be fed independently into a mixing vessel or feed line ahead of the reactor where they are allowed to pre-contact each other in a hydrocarbon solvent for about 1 minute to about 10 hours at temperatures ranging from about −20° C. to about 100° C. After mixing and/or holding, the contacted catalyst and co-catalyst can both be fed to polymerization reactor. Because each feed stream can be measured and controlled independently, pre-contacting the catalyst and the co-catalyst provides a method of continuously controlling the composition of the catalyst and thereby the properties of the polymer produced. Alternatively, some or all of the catalyst and co-catalyst may also be fed directly into the reaction zone where they contact each other for the first time in the presence of the monomer.

Examples of useful co-catalysts include organoaluminum compounds such as triethylaluminum, organoboron compounds such as triethylboron, tri-n-butylborane, and tripropylborane, and combinations thereof. Other suitable organoaluminum compounds include aluminum alkyls such as $R_3Al$, $R_2AlX$, and $AlX_2$ compounds where R is a 1 to 12 carbon atom hydrocarbyl radical and X is a halogen such as chlorine. The co-catalyst may, for example, be triethylaluminum chloride or diethylaluminum chloride. Other suitable organoboron compounds include trialkyl boron compounds, particularly those having alkyl groups of 1 to 12 carbon atoms or 2 to 5 carbon atoms, such as triethylborane, triaryl boron compounds such as triphenylborane, alkyl boron alkoxides such as $B(C_2H_5)_2OC_2H_5$ and halogenated alkyl boron compounds such as $ClB(C_2H_5)_2$. Alkyls of lithium, magnesium, zinc, and other metals and organohydrosilanes may also be used as a co-catalyst.

If a co-catalyst is used, the co-catalyst can be on a support or not. The amount of co-catalyst present in the reaction zone may be in the range of from about 0.2 to about 25 or from about 0.2 to about 10 parts per million by weight, based on the weight of the solvent or diluent in systems employing such solvent or diluent. In the event that a solvent or diluent is used, the catalyst and co-catalyst can be added together or separately into the reactor.

In certain embodiments, the catalyst of the present invention may be impregnated with a co-catalyst. In some embodiments, the core is impregnated with co-catalyst prior to incorporation of the transition metal onto the support. When no solvent or diluent is used, the amount of co-catalyst to chromium mole ratio may be in the range of from about 0.1:1 to about 100:1, alternatively from about 0.5:1 to about 50:1, or from about 1:1 to 10:1.

In some embodiments, the co-catalyst can be a Ziegler-Natta catalyst which is used to produce a bimodal polymer in a single reactor using one set of polymerization conditions. Suitable Ziegler-Natta catalyst include those disclosed in U.S. Pat. Nos. 5,275,992, 5,237,025, 5,244,990, 5,179,178, 4,855,271, 5,179,178, 5,275,992, and 4,607,019.

While the invention has been described with a limited number of embodiments, these specific embodiments are not intended to limit the scope of the invention as otherwise described and claimed herein. Modification and variations from the described embodiments exist. More Specifically, the following examples are given as specific illustrations of embodiments of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above is also specifically disclosed.

Still further, the claims as originally filed are intended to act as their own support, individually or in any combination. More specifically, the present specification is intended to literally incorporate expressly herein by reference or otherwise any invention expressed as the combination of any one or more limitations recited in any originally filed claim or combination of one or more originally filed claims.

Example 1

A nominal 30 weight percent silica clad alumina was prepared as follows. 80 g of commercial lanthana (4.0 wt. %) doped gamma-alumina (Grace Davison Grade MI-386) was formed into a slurry with 800 g of DI water. The slurry was heated to and maintained at 97° C. for 1 hour. Separately, a 50 vol. % solution of sodium silicate was prepared by mixing 150 cc of DI water with 150 cc of sodium silicate (26 wt. % $SiO_2$). About 213 g of a 50 vol. % sodium silicate solution was pumped into the alumina slurry at a flow rate of 3 cc/min. The pH of the resultant mixture was 10. The temperature of the slurry was maintained at 95° C. with stirring for 30 minutes. A 1M HCl solution was then added at a flow rate of 6 cc/min until the pH reached 7.5. The slurry was aged at 95° C. for an hour and then cooled to 60° C. About one third of the slurry was washed with 1 L of 1% solution of ammonium nitrate to remove residual Na. The resultant filter cake was reslurried in DI water and spray dried at 100° C. The spray-dried powder was calcined at 700° C. for two hours.

The calcined powder had a BET surface area of 180 $m^2/g$. The Sulfation Test was performed by loading 50 mg of sample into a thermo gravimetric analyzer (TGA). The sample was initially contacted with 107.5 cc/min of He gas for 1 hour at 300° C. After this treatment, a flow of $SO_2$ in He (1.14% $SO_2$) was introduced at 5 cc/min and simultaneously $O_2$ was introduced at 12.5 cc/min. The total flow rate was 125 cc/min and the $SO_2$ concentration was 456 ppm. Sulfur uptake measurements were taken over time. After 120 minutes, the sulfur uptake had equilibrated as indicated by lack of uptake. The sulfur uptake (SU) of the sample was 0.0% and the NSU was 0.0 $\mu g/m^2$-sample. The results are given in Table 1 below.

Example 2

A nominal 5.0% silica clad alumina was prepared by slurring 50 parts of a commercial un-doped gamma-alumina (Grace Davison Grade MI-307 alumina) in 572.3 parts of DI water. The acid treatment, washing and drying was carried out as described in Example 1 except that 17.86 parts of 50 vol. % sodium silicate solution was used.

The surface area (BET) of the sample was determined to be 166 $m^2/g$. The sulfur uptake (SU) was measured in the same manner as described in Example 1 above. The SU of the sample was 0.17 wt. % and the NSU was 10.2 μg/m²-sample. The results are given in Table 1 below.

Example 3

A 7% silica clad alumina was prepared and tested in the same manner as described in Example 1 above, except that the alumina used was an undoped commercial delta-alumina (Grace Davison Grade MI-407). The BET surface area of the sample was 123 m²/g, the sulfur uptake (SU) was 0.05 wt % and the NSU was 4.1 μg/m²-sample. The results are given in Table 1 below.

Example 4

A nominal 10% silica on alumina (50 g batch) was prepared by slurring 47 parts of gamma-alumina (Grace Davison Grade MI-386 having 4% lanthana doped alumina) in 540 parts of DI water. The acid treatment, washing and drying were carried out in the same manner as described in Example 1 above except that only 17.86 parts of 50-vol % sodium silicate solution was used. The sample was tested in the same manner as described in Example 1 above. The BET surface area of the sample was 168 m²/g, the sulfur uptake (SU) was 0.03 wt % and NSU was 1.6 μg/m²-sample. The results are given in Table 1 below.

Example 5

A 300 g batch of 10.7% silica on alumina was prepared as follows. 284.4 grams of gamma-alumina (Grace Davison Grade MI-307; undoped) was slurried in 3240 g of DI water. Separately 300 ml of DI water was mixed with 300 ml of sodium silicate (26%). 214.3 gms of this diluted sodium silicate mixture was added to the alumina slurry at a temperature of 95° C. The addition rate was 6 cc/min. After all the silicate was added, the mixture was maintained at 95° C. with stirring for 30 minutes. This solution was then acidified, washed, dried and calcined, as described in Example 1 above.

The sample was tested in the same manner as described in Example 1 above. The BET surface area of the sample was 147 m²/g, the sulfur uptake (SU) was 0.01 wt % and NSU was 0.7 μg/m²-sample. The results are given in Table 1 below.

Example 6

A 21.6% silica on alumina (50 g batch) was prepared by slurring 42 parts of gamma-alumina (Grace Davison Grade MI-386; a 4% lanthanum-doped alumina) in 482 parts of DI water. The acid treatment, washing and drying were carried out in the same manner as described in Example 1 above except that 71.43 parts of 50-vol % sodium silicate solution was used.

The sample was tested in the same manner as described in Example 1 above. The BET surface area of the sample was 157 m²/g, the sulfur uptake (SU) was 0.0 wt % and the NSU was 0.0 μg/m²-sample. The results are given in Table 1 below.

Example 7

A 29.6% silica on alumina was prepared by slurring 40 parts of gamma-alumina (Grace Davison Grade MI-307 (un-doped alumina) in 450 parts of DI water. The acid treatment, washing and drying were carried out in the same manner as described in Example 1 above except that 106.5 parts of 50-vol % sodium silicate solution was used.

The sample was tested in the same manner as described in Example 1 above. The BET surface area of the sample was 115 m²/g, the sulfur uptake (SU) was 0.0 wt % and the NSU was 0.0 μg/m²-sample. The results are given in Table 1 below.

Example 8

A 11.8% silica on alumina was prepared by slurring 1466.2 parts of alumina (Grace Davison Grade MI-107 (un-doped boehmite alumina; 73.66% Solids) in 12,800 parts of DI water. The acid treatment was carried out in a manner similar to Example 1 above, except that 1.2N nitric acid was used instead of HCl. Washing, drying were carried out in the same manner as described in Example 1. The sample was calcined at 750° C. for 4 hours.

The sample was tested in the same manner as described in Example 1 above. The surface area of the sample was 314 m²/g, the sulfur uptake (SU) was 0.17 wt % and the NSU was 5.3 μg/m²-sample. The results are given in Table 1 below.

Example 9

A 11.3% silica on alumina was prepared by slurring 779.2 parts of alumina (Grace Davison Grade MI-186 having 4% Lanthanum-doped boehmite alumina; 69.3% solids) in 6350 parts of DI water. The acid treatment was carried out in the same manner as described in Example 1, except that 1.2N nitric acid was used instead of HCl. Washing, drying were carried out in the same manner as described in Example 1. The sample was calcined at 750° C. for 4 hours.

The sample was tested in the same manner as described in Example 1 above. The BET surface area of the sample was 321 m²/g, the sulfur uptake (SU) was 0.23 wt % and the NSU was 7.2 μg/m²-sample. The results are given in Table 1 below.

The following examples, labeled "comparative", are given for comparative purposes only and are not meant to be illustrative of the present invention.

Comparative Example 1

A commercial lanthanum-doped (4 wt %) gamma-alumina (Grace Davison Grade MI-386) was tested for sulfur uptake using the standard Sulfur Uptake test described in Example 1 above. The BET surface area of the sample was 178 m²/g, the pore volume was 0.77 cc/g, the sulfur uptake (SU) was 1.42 wt % and NSU was 79.8 μg/m²-sample. The results are also given in Table 1 below.

Comparative Example 2

A commercial gamma-alumina (updoped) (Grace Davison Grade MI-307) was tested for sulfur uptake in the manner described in Comparative Example 1 above. The BET surface area of the sample was 172 m²/g, the pore volume was 0.77 cc/g, the sulfur uptake (SU) was 1.1 wt % and NSU was 64.0 μg/m²-sample. The results are also given in Table 1 below.

Comparative Example 3

A commercial delta-alumina (updoped) (Grace Davison Grade MI-407) was tested for sulfur uptake. The BET surface area of the sample was 123 m²/g, the sulfur uptake (SU) was 0.66 wt % and NSU was 53.6 μg/m²-sample. The results are also given in Table 1 below.

Comparative Example 4

A commercial 5.5% silica in alumina (Grace Davison Grade MI-120) prepared by conventional co-precipitation was tested for sulfur uptake. The BET surface area of the sample was 265 m²/g, the sulfur uptake (SU) was 0.65 wt % and NSU was 24.50 μg/m²-sample. The results are also given in Table 1 below.

Comparative Example 5

A commercial product having nominally 10% silica in alumina (Condea Grade Siral 10) was tested for sulfur uptake after calcinations at 700 C for 2 hours. The BET surface area of the sample was 225 m²/g, the sulfur uptake (SU) was 0.55 wt % and NSU was 24.2 μg/m²-sample. The results are also given in Table 1 below.

Comparative Example 6

A commercial product having nominally 30% silica in alumina (Grace Davison Grade MI-130) prepared by conventional co-precipitation was calcined at 700° C. The BET surface area of the sample was 350 m²/g, the sulfur uptake (SU) was 0.70 wt % and NSU was 20.0 μg/m²-sample. The results are also given in Table 1 below.

Comparative Example 7

A nominal 30 wt % silica containing alumina was prepared as follows. 65.3 parts commercial bohemite alumina powder (Davison Grade MI-107; total solids=75%) was slurried in 210 parts of DI water and thoroughly mixed. To this slurry, 70 parts of commercial colloidal silica (Ludox Grade AS-30 with 30% silica) was impregnated and mixed thoroughly. The slurry was spray dried and calcined at 700° C. for 2 hours. The BET surface area of the sample was 250 m²/g, the sulfur uptake (SU) was 1.07 wt % and NSU was 42.8 μg/m²-sample. The results are also given in Table 1 below.

Comparative Example 8

A 32.4% silica containing alumina was prepared as follows. 3.68 parts of gamma-alumina powder (Davison Grade MI-386) was impregnated with 3.75 parts of commercial colloidal silica (Ludox Grade AS-40 with 40% silica) with constant stirring. The sample was dried in a drying oven at 100° C., and calcined at 700 C for 2 hours. The BET surface area of the sample was 150 m²/g, the sulfur uptake (SU) was 0.8 wt % and NSU was 53.3 μg/m²-sample. The results are also given in Table 1 below.

TABLE 1

Summary of Results for Silica Alumina Samples

| Example No | Silica (%) | Surface Area (m²/g) | Sulfur Uptake (SU) (%) | Normalized Sulfur Uptake (NSU) (μg/m²) |
|---|---|---|---|---|
| 1 | 30 | 130 | 0.00 | 0.0 |
| 2 | 5.0 | 166 | 0.17 | 10.2 |
| 3 | 7.0 | 123 | 0.05 | 4.1 |
| 4 | 10 | 168 | 0.03 | 1.8 |
| 5 | 10.7 | 147 | 0.01 | 0.7 |
| 6 | 21.6 | 157 | 0.00 | 0.0 |
| 7 | 29.6 | 115 | 0.00 | 0.0 |
| 8 | 11.8 | 314 | 0.17 | 5.3 |
| 9 | 11.3 | 321 | 0.23 | 7.2 |
| Comp 1 | 0 | 178 | 1.42 | 79.8 |
| Comp 2 | 0 | 172 | 1.10 | 64.0 |
| Comp 3 | 0 | 123 | 0.66 | 53.6 |
| Comp 4 | 5.5 | 265 | 0.65 | 24.5 |
| Comp 5 | 10 | 225 | 0.55 | 24.2 |
| Comp 6 | 30 | 350 | 0.70 | 20.0 |
| Comp 7 | 30 | 250 | 1.07 | 42.8 |
| Comp 8 | 32.4 | 150 | 0.8 | 53.3 |

Example 10

Samples used in this example were prepared using ~100 micron APS GAP 7104 Alumina. In the nominal 10% SiO₂ sample (illustrative of all samples in Table 2, varying only silicate content), a modified support was prepared by calcining the above alumina at 700° C./2 hrs and then slurrying 50 g in water heating to 95° C. with stirring, adding 36 mL of 14% sodium silicate, +35.7 mL water. After stirring 30 minutes, adding 1N nitric acid to lower pH to 7.4 and heating/stirring 1 hr to deposit silica. The resulting material was washed 3× with 1% NH₄NO₃ and then 1× with hot water. After filtration of the solids they were dried 120° C./2 hrs in air. The resulting new support had 11.3% SiO₂ (analyzed by ICP) The SA was 255, PV 1.12 and APD 176 A. Other supports were prepared by analogous methods.

Figure 2:
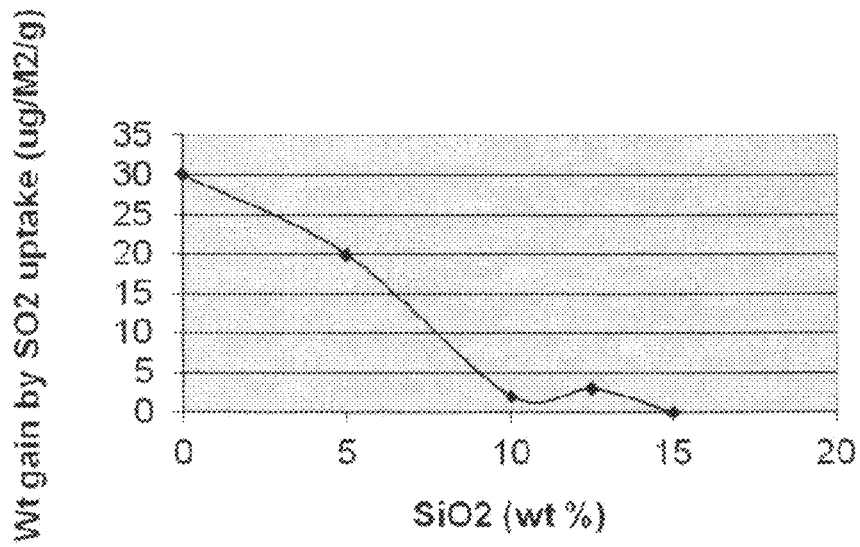
FIG. 2 presents a plot of weight gain by $SO_2$ uptake versus % $SiO_2$ cladding (weight percent) for polyolefin catalyst supports.

The Sulfation Test was performed by loading 50 mg of sample into a thermo gravimetric analyzer (TGA). The sample was initially contacted with 107.5 cc/min of He gas for 1 hour at 300° C. After this treatment, a flow of SO₂ in He (1.14% SO₂) was introduced at 5 cc/min and simultaneously O₂ was introduced at 12.5 cc/min. The total flow rate was 125 cc/min and the SO₂ concentration was 456 ppm. Sulfur uptake measurements were taken over time. After 150 minutes, the sulfur uptake had equilibrated as indicated by lack of uptake. The Sulfur Uptake (SU) is defined as percentage of weight gained after 150 minutes of time-on-stream. Normalized sulfur uptake (NSU) is calculated by the following formula:

$$NSU = \frac{SU(\text{wt }\%)}{100 \times SA}$$

where SU is the sulfur uptake in weight percent measured after 150 minutes of time-on-stream, and SA is the BET surface area of the sample. Results are reported in Table 2. In the table, PV is nitrogen pore volume reported in cc/g. APD is average pore diameter in Angstroms calculated from the BET SA and PV. Nominal SiO₂% is the theoretical weight percentage of SiO₂ on the support. Actual SiO2 is the measured percentage SiO₂ on the support. A plot of weight gain by SO₂ uptake versus SiO₂ (weight percent) is presented in FIG. 2.

TABLE 2

Silica-Cladded Alumina Supports for Polyolefin Catalysts

| Nominal SiO₂ % | Actual SiO₂ | SA | PV (total) | APD | SO₂ ug/M² |
|---|---|---|---|---|---|
| Alumina, as is | 0 | 373 | 1.27 | 136 | NA |
| Alumina, calcined at 700° C./1 h | 0 | 271 | 1.63 | 239 | 30 |

TABLE 2-continued

Silica-Cladded Alumina Supports for Polyolefin Catalysts

| Nominal SiO$_2$ % | Actual SiO$_2$ | SA | PV (total) | APD | SO$_2$ ug/M$^2$ |
|---|---|---|---|---|---|
| 5 | | 305 | 1.37 | 180 | 20 |
| 7.5 | | 282 | 1.23 | 174 | 4.6 |
| 10 | 11.3 | 281 | 1.20 | 172 | 2.1 |
| 12.5 | 13.2 | 264 | 1.10 | 167 | 1.5 |
| 15 | | 256 | 1.11 | 173 | 0 |

Table 3 presents data on double calcined supports. In these examples, the supports from Table 2 were calcined at 700° C. for 2 hours both before and after cladding and then tested.

TABLE 3

Double Calcined Supports

| Nom. | double-Calcined 700° C./2 hr Before/After Cladding | | |
|---|---|---|---|
| SiO2 | SA | PV | APD |
| 5 | 238 | 1.25 | 210 |
| 10 | 224 | 1.14 | 199 |
| 15 | 194 | 1.04 | 215 |

Example 11

An aqueous suspension of primary alumina particles is made by reaction of sodium aluminate with aluminum sulfate following the method described in Example 1 of U.S. Pat. No. 4,154,812. The resulting alumina solids are filtered and washed with water to remove byproduct salts such as sodium sulfate. The slurry of washed primary alumina particles, of an average diameter between 2 and 10 microns, is next cladded and washed as described in Example 10 with a silica loading between 3 and 15%. The suspension of cladded primary particles is used at between 5 and 25% solids content as the feed to a spray drier, operating at an inlet temperature between 315° C. (600° F.) and 427° C. (800° F.) and an outlet temperature of between 100° C. (212° F.) and 200° C. (392° F.). The spray-dried material is subsequently used as a support for a catalyst in a fluidized reactor.

Example 12

GAP 7104 alumina obtained from Grace ART (Chicago) was used as substrate for SiO$_2$ cladding. This alumina before further processing had the following properties: SA=373 PV 1.27, average pore diameter 136; (APS)=98μ.

A baseline reference catalyst was made by impregnating the alumina, after 2 hr/700° C. calcining, by the method of contacting 25 g of support material with a solution of 1 g Cr acetate dissolved in 41 cc MeOH. Then the material was vacuum dried at 32° C. and activated by heating in air (upflow configuration) at 1200° F. for 4 hrs. When tested in polymerization of polyethylene at 80° C., 500 psig pressure, with i-butane solvent and triisobutyl aluminum (TiBAl) co-catalyst at 0.1 g (0.5 mmol) mg along with 76 mg of the Cr/alumina supported catalyst, an activity of 648 g PE/g catalyst/hr resulted.

A modified support at nominally 10% silica loading was prepared by calcining the above alumina at 700° C./2 hrs and then slurrying 50 g in water heating to 95° C. with stirring, adding 36 mL of 14% sodium silicate, +35.7 mL water. After stirring 30 minutes, adding IN nitric acid to lower pH to 7.4 and heating/stirring 1 hr to deposit silica. The resulting material was washed 3× with 1% NH$_4$NO$_3$ and then 1× with hot water. After filtration of the solids they were dried 120° C./2 hrs in air. The resulting new support had 11.3% SiO (ICP chemical analysis). The SA was 255, PV 1.12 and APD 176 A. This 11% SiO$_2$ support when converted to a 1% Cr catalyst and tested as above yielded activity of 1045.

What is claimed:

1. A process for making an olefin polymerization catalyst comprising:
   contacting (a) a catalyst support, which comprises a core of alumina particles and about 1 to about 40 weight percent silica cladding, based on the weight of said clad catalyst support, on the surface of said core, said clad catalyst support having a BET surface area of greater than 20 m$^2$/g; a porosity of at least about 0.2 cc/g; and a Normalized Sulfur Uptake (NSU) value of up to 25 μg/m$^2$; with (b) a solution comprising a salt or other soluble compound of at least one transition metal in an inert liquid to produce an unactivated olefin polymerization catalyst; and treating said unactivated olefin polymerization catalyst with a heated gas to produce an activated catalyst, wherein the transition metal is selected from Fe, Cr, Ti, Zr, Hf, Ni, Mg or mixtures thereof.

2. The process of claim 1, wherein said salt comprises (i) chromium acetate or chromium nitrate alone or with (ii) titanium salt or compound.

3. A process for making an olefin polymerization catalyst comprising:
   forming a clad catalyst support comprising (a) alumina particulate core comprising (i) primary particles or (ii) agglomerates of primary particles and (b) about 1 to about 40 weight percent silica cladding on the surface of said particulates, based on the weight of said clad catalyst support, said clad catalyst support having a BET surface area of greater than 20 m$^2$/g, a porosity of at least about 0.2 cc/g, and a Normalized Sulfur Uptake (NSU) of to 25 μg/m$^2$;
   contacting said clad catalyst support with a solution comprising a salt of at least one transition metal selected from Fe, Cr, Ti, Zr, Hf, Ni, or mixtures thereof to produce an unactivated catalyst; and
   treating said unactivated catalyst with a heated gas to produce an activated transition metal catalyst.

4. The process of claim 3, wherein said clad catalyst support is formed by steps comprising
   forming a 5 to 50 weight percent aqueous slurry of alumina particulate maintained at 50° to 100° C.;
   contacting said slurry with a sufficient amount of a solution having from 5 to 30 weight percent of an alkali metal silicate compound to provide a mixture which can result in a 1 to 40 weight percent silica clad alumina particulate, and maintaining said mixture at a temperature of from 50° to 100° C. for about 1 to 120 minutes;
   adding an aqueous solution of a water soluble acid to said mixture in a slow, uniform manner to produce a suspension having a pH of from 5 to 8;
   removing alkali metal from the suspension and recovering solid product therefrom; and
   treating the solid product to elevated temperature of from 400° to 1000° C. to produce silica clad alumina particulate.

5. The process of claim 3, wherein the alumina particles are clad as agglomerated alumina particles.

6. The process of claim 3, wherein the alumina particles are first clad as primary particles and then formed into agglomerated particles.

7. The process of claim 3, wherein said solution comprises a transition metal salt dissolved in water or alcohol solvent, the concentration of said transition metal salt in said solvent being 0.01 to 1 Molar.

8. The process of claim 3, wherein said transition metal salt comprises (i) chromium acetate, chromium nitrate, titanium sulfate or mixtures thereof.

9. The process of claim 3 wherein said transition metal is selected from chromium, titanium, or mixtures thereof.

10. A process for making an olefin polymerization catalyst comprising:
forming a clad catalyst support comprising (a) alumina particulate core comprising (i) primary particles or (ii) agglomerates of primary particles and about 1 to about 40 weight percent silica cladding on the surface of said particulates, based on the weight of said clad catalyst support, said clad catalyst support having a BET surface area of greater than 20 m$^2$/g, a porosity of at least about 0.2 cc/g, and a Normalized Sulfur Uptake (NSU) of to 25 µg/m$^2$;
contacting, in an inert liquid (a) a silica clad support, which comprises a core of alumina particles and about 1 to about 40 weight percent silica cladding, based on the weight of said clad catalyst support, on the surface of said core; said clad support having a BET surface area of greater than 20 m$^2$/g; a porosity of at least about 0.2 cc/g; and a Normalized Sulfur Uptake (NSU) value of up to 25 µg/m$^2$; with (b) a transition metal catalyst component, wherein said transition metal is selected from Fe, Cr, Ti, Zr, Hf, Ni, or mixtures thereof; and is further selected from:
(i) at least one transition metal halide, alkyl, aryl, or alkoxy compound and mixtures thereof in combination with Group I through III elements of the Periodic Table;
(ii) organometallic compounds having a transition metal in coordination with members of at least one five-member carbon ring, hetero-substituted five-member carbon ring, or a bridged (ansa) ligand coordinating to a transition or rare earth metal wherein the ansa bridge can be carbon, silicon, phosphorus, sulfur, oxygen, nitrogen, germanium, ethylene, dimethylsilyl, diphenylsilyl, isopropylidene, diphenylphosphoryl, tetramethyldisilane group; or
(iii) a bidentate or tridentate ligand/transition metal complex.

11. The process of claim 10, wherein the bidentate or tridentate complex (iii) is selected from bidentate or tridentate complex of nickel or palladium.

12. The process of claim 3 or 10 wherein said catalyst support has a BET surface area of from 100 to 300 m$^2$/g, a pore diameter of from 100 to 300 Angstroms, a pore volume of from 0.5 to 1.2 cc/g and a Normalized Sulfur Uptake of up to 10 µg/m$^2$.

13. The process of claim 3 or 10 wherein said alumina particulate core is doped with metals or metal oxides chosen from alkaline earth metal oxides, rare earth oxides and silica in an amount of between 0.1 to 10% of the weight of the clad catalyst support.

14. The process of claim 3 or 10, wherein said core has at least 5 weight percent silica clad thereon.

15. The process of claim 3 or 10, wherein said transition metal of said catalytically active olefin polymerization catalyst (II) is selected from Cr, Ti, or mixtures thereof and is present in a high oxidation state.

* * * * *